(12) United States Patent
Culler et al.

(10) Patent No.: US 8,142,891 B2
(45) Date of Patent: *Mar. 27, 2012

(54) DISH-SHAPED ABRASIVE PARTICLES WITH A RECESSED SURFACE

(75) Inventors: Scott R. Culler, Burnsville, MN (US); Dwight D. Erickson, Oakdale, MN (US); Negus B. Adefris, Woodbury, MN (US); John T. Boden, White Bear Lake, MN (US); John D. Haas, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 447 days.

This patent is subject to a terminal disclaimer.

(21) Appl. No.: 12/336,961

(22) Filed: Dec. 17, 2008

(65) Prior Publication Data

US 2010/0151195 A1 Jun. 17, 2010

(51) Int. Cl.
*B24D 3/00* (2006.01)
*B32B 5/16* (2006.01)

(52) U.S. Cl. .......................................... 428/402; 51/309

(58) Field of Classification Search .................. 428/402; 51/309

See application file for complete search history.

(56) References Cited

U.S. PATENT DOCUMENTS

| | | |
|---|---|---|
| 1,910,444 A | 5/1933 | Nicholson |
| 3,041,156 A | 6/1962 | Rowse et al. |
| 3,079,243 A | 2/1963 | Ueltz |
| 3,387,957 A | 6/1968 | Howard |
| 3,536,005 A | 10/1970 | Derrickson |
| 3,874,856 A | 4/1975 | Leeds |
| 3,909,991 A | 10/1975 | Coes, Jr. |
| 4,150,078 A | 4/1979 | Miller et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,548,617 A | 10/1985 | Miyatani et al. |
| 4,744,802 A | 5/1988 | Schwabel |
| 4,799,939 A | 1/1989 | Bloecher et al. |
| 4,848,041 A | 7/1989 | Kruschke |
| 4,954,462 A | 9/1990 | Wood |
| 4,963,012 A | 10/1990 | Tracy |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |

(Continued)

FOREIGN PATENT DOCUMENTS

CA 743 715 10/1966

(Continued)

OTHER PUBLICATIONS

U.S. Appl. No. 61/016,965 entitled "Shaped, Fractured Abrasive Particle, Abrasive Article Using Same and Method of Making", filed Dec. 27, 2007, now expired.

(Continued)

*Primary Examiner* — Hoa (Holly) Le

(74) *Attorney, Agent, or Firm* — Scott A. Baum

(57) ABSTRACT

Abrasive particles comprising dish-shaped abrasive particles each having a sidewall; each of the shaped abrasive particles comprising alpha alumina and having a first face and a second face separated by a thickness, t; and wherein either the first face or the second face is recessed or concave.

20 Claims, 7 Drawing Sheets

U.S. PATENT DOCUMENTS

| | | | |
|---|---|---|---|
| 5,035,723 | A | 7/1991 | Kalinowski |
| 5,042,991 | A | 8/1991 | Kunz et al. |
| 5,049,645 | A | 9/1991 | Nagaoka et al. |
| 5,078,753 | A | 1/1992 | Broberg et al. |
| 5,085,671 | A | 2/1992 | Martin et al. |
| 5,090,968 | A | 2/1992 | Pellow |
| 5,120,327 | A | 6/1992 | Dennis |
| 5,152,917 | A | 10/1992 | Pieper et al. |
| 5,185,299 | A | 2/1993 | Wood et al. |
| 5,201,916 | A | 4/1993 | Berg et al. |
| 5,213,591 | A | 5/1993 | Celikkaya et al. |
| 5,282,875 | A | 2/1994 | Wood |
| 5,304,331 | A | 4/1994 | Leonard et al. |
| 5,312,789 | A | 5/1994 | Wood |
| 5,312,791 | A | 5/1994 | Coblenz et al. |
| 5,366,523 | A | 11/1994 | Rowenhorst et al. |
| 5,409,645 | A | 4/1995 | Torre, Jr. et al. |
| 5,431,967 | A | 7/1995 | Manthiram |
| 5,435,816 | A | 7/1995 | Spurgeon et al. |
| 5,441,549 | A | 8/1995 | Helmin |
| 5,443,603 | A | 8/1995 | Kirkendall |
| 5,454,844 | A | 10/1995 | Hibbard et al. |
| 5,496,386 | A | 3/1996 | Broberg et al. |
| 5,516,348 | A | 5/1996 | Conwell et al. |
| 5,551,963 | A | 9/1996 | Larmie |
| 5,576,409 | A | 11/1996 | Mackey |
| RE35,570 | E | 7/1997 | Rowenhorst et al. |
| 5,645,619 | A | 7/1997 | Erickson |
| 5,667,542 | A | 9/1997 | Law et al. |
| 5,672,097 | A | 9/1997 | Hoopman |
| 5,725,162 | A | 3/1998 | Garg |
| 5,776,214 | A | 7/1998 | Wood |
| 5,779,743 | A | 7/1998 | Wood |
| 5,893,935 | A | 4/1999 | Wood |
| 5,902,647 | A | 5/1999 | Venkataramani |
| 5,908,477 | A | 6/1999 | Harmer et al. |
| 5,908,478 | A | 6/1999 | Wood |
| 5,946,991 | A | 9/1999 | Hoopman |
| 5,975,987 | A | 11/1999 | Hoopman et al. |
| 5,984,988 | A | 11/1999 | Berg et al. |
| 6,019,805 | A | 2/2000 | Herron |
| 6,053,956 | A | 4/2000 | Wood |
| 6,054,093 | A | 4/2000 | Torre, Jr. et al. |
| 6,080,215 | A | 6/2000 | Stubbs |
| 6,080,216 | A | 6/2000 | Erickson |
| 6,129,540 | A | 10/2000 | Hoopman et al. |
| 6,206,942 | B1 | 3/2001 | Wood |
| 6,228,134 | B1 | 5/2001 | Erickson |
| 6,261,682 | B1 | 7/2001 | Law |
| 6,264,710 | B1 | 7/2001 | Erickson |
| 6,277,160 | B1 | 8/2001 | Stubbs |
| 6,277,161 | B1 | 8/2001 | Castro |
| 6,287,353 | B1 | 9/2001 | Celikkaya |
| 6,312,324 | B1 | 11/2001 | Mitsui et al. |
| 6,319,108 | B1 | 11/2001 | Adefris |
| 6,475,253 | B2 | 11/2002 | Culler et al. |
| 6,524,681 | B1 | 2/2003 | Seitz et al. |
| 6,696,258 | B1 | 2/2004 | Wei |
| 6,843,815 | B1 | 1/2005 | Thurber et al. |
| 6,881,483 | B2 * | 4/2005 | McArdle et al. ............ 428/403 |
| 6,974,930 | B2 | 12/2005 | Jense |
| 7,297,402 | B2 | 11/2007 | Evans |
| 7,373,887 | B2 | 5/2008 | Jackson |
| 2001/0027623 | A1 | 10/2001 | Rosenflanz |
| 2002/0026752 | A1 | 3/2002 | Culler et al. |
| 2002/0151265 | A1 | 10/2002 | Adefris |
| 2003/0085204 | A1 | 5/2003 | Lagos |
| 2003/0110707 | A1 | 6/2003 | Rosenflanz et al. |
| 2003/0126800 | A1 | 7/2003 | Seth et al. |
| 2004/0003895 | A1 | 1/2004 | Amano et al. |
| 2004/0148967 | A1 | 8/2004 | Celikkaya et al. |
| 2004/0235406 | A1 | 11/2004 | Duescher |
| 2004/0244675 | A1 | 12/2004 | Kishimoto |
| 2005/0020190 | A1 | 1/2005 | Schutz et al. |
| 2005/0060941 | A1 | 3/2005 | Provow |
| 2005/0060947 | A1 | 3/2005 | McArdle |
| 2005/0064805 | A1 | 3/2005 | Culler et al. |
| 2005/0132655 | A1 | 6/2005 | Anderson et al. |
| 2005/0232853 | A1 | 10/2005 | Evans |
| 2005/0284029 | A1 | 12/2005 | Bourlier |
| 2006/0185256 | A1 | 8/2006 | Nevoret et al. |
| 2007/0020457 | A1 | 1/2007 | Adefris |
| 2007/0072527 | A1 | 3/2007 | Palmgren |
| 2008/0172951 | A1 | 7/2008 | Starling |
| 2009/0016916 | A1 | 1/2009 | Rosenzweig et al. |
| 2009/0165394 | A1 * | 7/2009 | Culler et al. ............. 51/296 |
| 2010/0003904 | A1 * | 1/2010 | Duescher ............. 451/259 |
| 2010/0146867 | A1 * | 6/2010 | Boden et al. ............ 51/309 |
| 2010/0151196 | A1 * | 6/2010 | Adefris et al. ............ 428/142 |
| 2010/0151201 | A1 * | 6/2010 | Erickson et al. ............ 428/148 |
| 2010/0319269 | A1 * | 12/2010 | Erickson ............. 51/295 |

FOREIGN PATENT DOCUMENTS

| | | |
|---|---|---|
| EP | 0 293 163 | 11/1988 |
| EP | 0 662 110 | 7/1995 |
| GB | 986 847 | 3/1965 |
| JP | 60-006356 | 1/1985 |
| JP | 2002-038131 | 2/2002 |
| JP | 2003-049158 | 2/2003 |
| JP | 2004-510873 | 4/2004 |
| JP | 2006-192540 | 7/2006 |
| WO | WO95/18192 | 7/1995 |
| WO | WO99/38817 | 8/1999 |
| WO | WO01/14494 | 3/2001 |

OTHER PUBLICATIONS

U.S. Appl. No. 12/336,877 "Shaped, Fractured Abrasive Particle, Abrasive Article Using Same and Method of Making", filed Dec. 17, 2008.
U.S. Appl. No. 12/337,001 entitled "Method of Making Abrasive Shards, Shaped Abrasive Particles with an Opening, or Dish-Shaped Abrasive Particles", filed Dec. 17, 2008.
U.S. Appl. No. 12/337,112 entitled "Shaped Abrasive Particles With an Opening", filed Dec. 17, 2008.
U.S. Appl. No. 61/138,268 entitled "Shaped Abrasive Particles With Grooves", filed Dec. 17, 2008.
U.S. Appl. No. 12/337,075 entitled "Shaped Abrasive Particles With a Sloping Sidewall" filed Dec. 17, 2008.
Office Action dated Feb. 18, 2011 in U.S. Appl. No. 12/336,877.
U.S. Appl. No. 12/570,067 entitled "Shaped Abrasive Particles With Low Roundness Factor" filed Sep. 30, 2009.
Office Action dated Oct. 14, 2010 in U.S. Appl. No. 12/337,001.
Office Action dated Mar. 21, 2011 in U.S. Appl. No. 12/337,001.
Office Action dated Mar. 21, 2011 in U.S. Appl. No. 12/627,567.
Office Action dated Mar. 30, 2011 in U.S. Appl. No. 12/337,112.
Office Action dated Apr. 1, 2011 in U.S. Appl. No. 12/337,075.
U.S. Appl. No. 12/827,274 entitled "Transfer Assisted Screen Printing Method of Making Shaped Abrasive Particles and the Resulting Shaped Abrasive Particles", filed Jun. 30, 2010.
www.abrasivematerials.saint-gobain.com News—Shaped Abrasive Particles Article, Dated Apr. 25, 2011 and retrieved on May 23, 2011.
"Investigation of Shaped Abrasive Particles vol. 1: Review of US Pat. No. 6,054,093 Apr. 25, 2000" © Apr. 2011.

* cited by examiner

DISH-SHAPED ABRASIVE PARTICLES WITH A RECESSED SURFACE

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst; and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle it is possible to control the resulting performance of the abrasive article. The inventors have discovered that by making the abrasive particle dish-shaped with either a recessed or concave surface unexpected grinding benefits occur.

Without wishing to be bound by theory, it is believed that the recessed or concave face improves the amount of material removed by the dish-shaped abrasive particle. In particular, an ice cream scoop or a spoon has a concave shaped end that effectively digs into materials and removes a significant quantity of the material. A scoop is much more effective than a knife or a flat thin body when digging into and removing large quantities of material. Similarly, a hollow ground chisel having a concave surface produces a sharper edge. In a similar manner, placing a recessed or concave face onto the shaped abrasive particle thereby forming a dish-shaped abrasive particle can increase the grinding performance of the dish-shaped abrasive particle over a similarly shaped abrasive particle having a planar first face and a planar second face.

Secondly, by additionally forming the dish-shaped abrasive particles with a sloping sidewall, the dish-shaped abrasive particles with the sloping sidewall tend to rest on the make coat of a coated abrasive article at an angle corresponding to the draft angle of the sidewall. It is believed that a draft angle other than 90 degrees results in the dish-shaped abrasive particles leaning instead of having a 90 degree orientation to the backing in a coated abrasive article since the sidewall, which the dish-shaped abrasive particle in the coated abrasive rests on, is sloped due to the draft angle. Because the dish-shaped abrasive particles are mostly tipped or leaning to one side due to the angled sidewall they rest on, they can have a rake angle less than 90 degrees relative to the workpiece thereby enhancing cut rates. It is believed that this rake angle enhances the cut rate of the dish-shaped abrasive particles.

Hence, in one embodiment, the invention resides in abrasive particles comprising: dish-shaped abrasive particles each having a sidewall, each of the dish-shaped abrasive particles comprising alpha alumina and having a first face and a second face separated by a varying thickness, T, and wherein the first face is recessed and a thickness ratio of Tc/Ti for the dish-shaped abrasive particles is between 1.25 to 5.00.

In another embodiment, the invention resides in abrasive particles comprising: dish-shaped abrasive particles each having a sidewall, each of the dish-shaped abrasive particles comprising alpha alumina and having a first face and a second face separated by a thickness, T, and wherein the first face is convex and the second face is concave.

In another embodiment, the invention resides in abrasive particles comprising: dish-shaped abrasive particles each having a sidewall, each of the dish-shaped abrasive particles comprising alpha alumina and having a first face and a second face separated by a varying thickness, T, and wherein the first face is recessed and the second face is recessed.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Figure 1A:
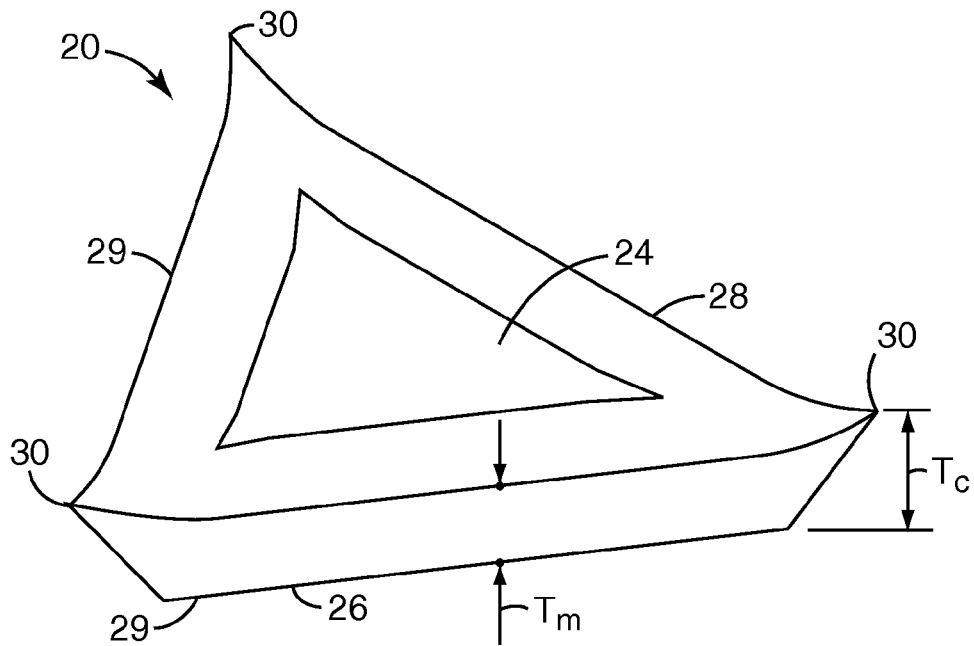
FIG. 1A illustrates a perspective view of one embodiment of a dish-shaped abrasive particle.

Repeated use of reference characters in the specification and drawings is intended to represent the same or analogous features or elements of the disclosure.

Definitions

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "precursor shaped abrasive particle or precursor dish-shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the shaped precursor abrasive particle. Except in the case of abrasive shards (e.g. as described in U.S. provisional application 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

DETAILED DESCRIPTION

Dish-Shaped Abrasive Particles

Figure 1B:
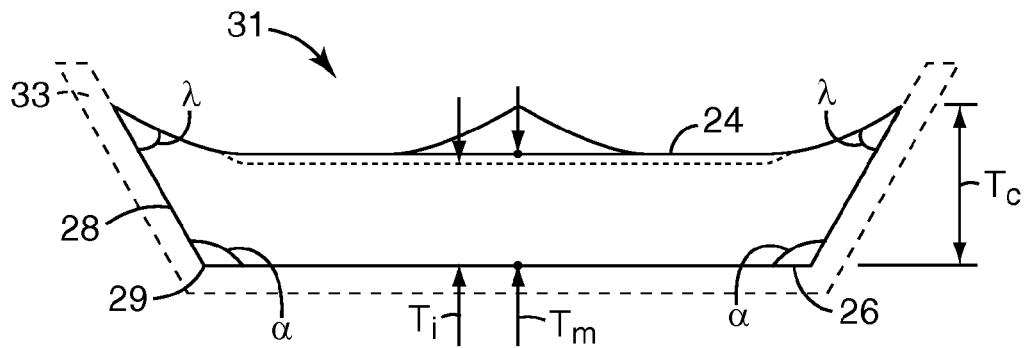
FIG. 1B illustrates a side view the dish-shaped abrasive particle of FIG. 1A.
Figure 1C:
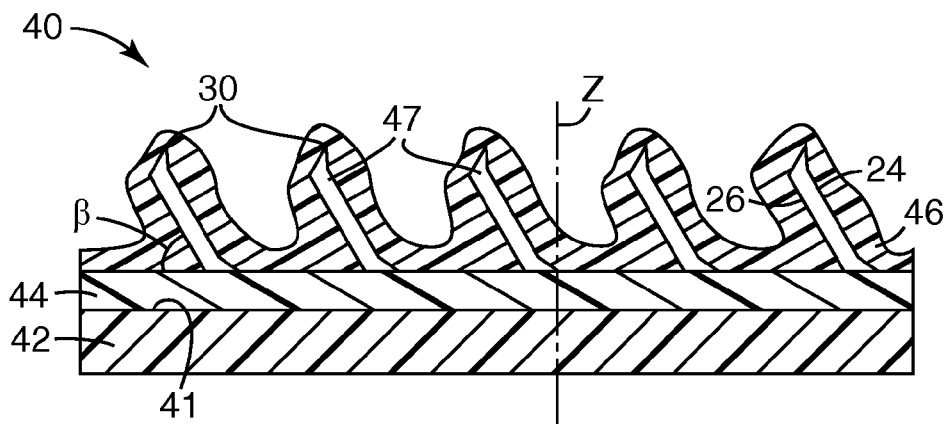
FIG. 1C illustrates a side view of a coated abrasive article made from the dish-shaped abrasive particles of FIG. 1A.

Referring to FIGS. 1A, 1B, and 1C an exemplary dish-shaped abrasive particle 20 is illustrated. The material from which the dish-shaped abrasive particle 20 is made comprises alpha alumina. Alpha alumina particles can be made from a dispersion of alpha aluminum oxide monohydrate that is gelled, molded to shape, dried to retain the shape, calcined, and then sintered as discussed herein later. The shaped abrasive particle's shape is retained without the need for a binder to form an agglomerate comprising abrasive particles in a binder that are then formed into a shaped structure.

In general, the dish-shaped abrasive particles 20 comprise thin bodies having a first face 24, and a second face 26 separated by a sidewall 28 having a varying thickness T. In general, the sidewall thickness is greater at the points or corners of the dish-shaped abrasive particles and thinner at the midpoints of the edges. As such, Tm is less than Tc. In some embodiments, the sidewall 28 is a sloping sidewall having a draft angle α greater than 90 degrees as discussed in more detail later herein. More than one sloping sidewall can be present and the slope or draft angle for each sloping sidewall may be the same as shown in FIGS. 1A and 1B or different for each side of the dish-shaped abrasive particle as discussed in copending U.S. patent application Ser. No. 12/337,075 entitled "Shaped Abrasive Particle With A Sloping Sidewall", filed on Dec. 17, 2008.

The sidewall 28 of the dish-shaped abrasive particle 20 can vary in shape and it forms a perimeter 29 of the first face 24 and a perimeter 29 of the second face 26. In one embodiment, the perimeter 29 of the first face 24 and second face 26 is selected to be a geometric shape, and the first face 24 and the second face 26 are selected to have the same geometric shape, although, they may differ in size with one face being larger than the other face. In one embodiment, the perimeter 29 of first face 24 and the perimeter 29 of the second face 26 was a triangular shape that is illustrated. In some embodiments, an equilateral triangular shape is used and in other embodiments an isosceles triangular shape is used.

Figure 2A:
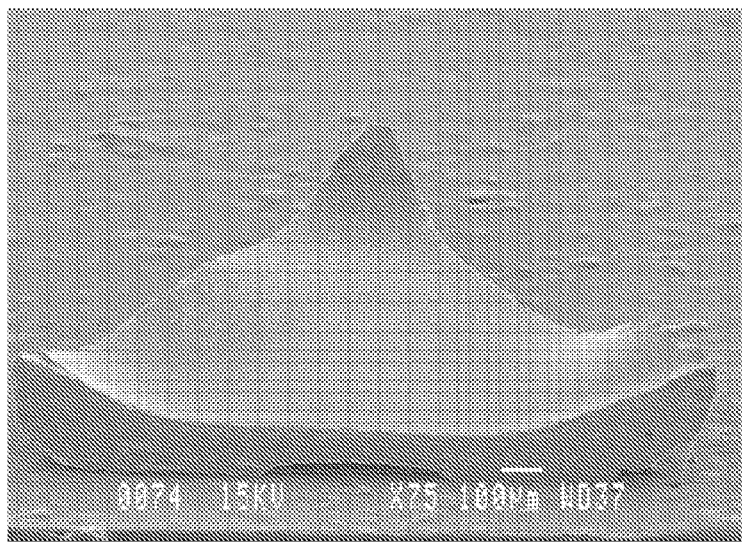
FIGS. 2A-C illustrate photomicrographs of the dish-shaped abrasive particles of FIG. 1A.
Figure 2B:
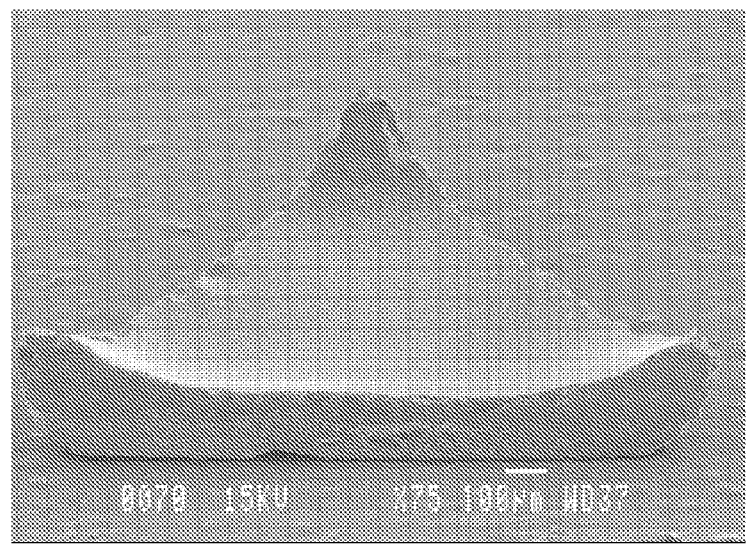
Figure 2C:
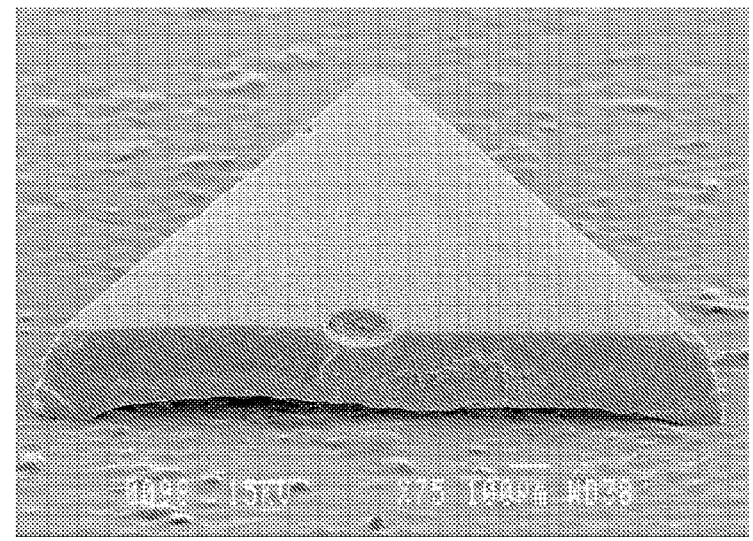

In some embodiments, the first face 24 is recessed and the second face 26 and sidewall 28 are substantially planar as shown in FIGS. 2A-2C. By recessed it is meant that that the thickness of the interior of the first face 24, Ti, is thinner than the thickness of the shaped abrasive particle at portions along the perimeter. In some embodiments, the recessed face has a substantially flat center portion and a plurality of upturned points or a plurality of raised corners similar to FIG. 2A. Notice in FIG. 2A that the perimeter of the dish-shaped abrasive particle appears to be flat or straight at portions between the upturned points or corners and the thickness Tc is much greater than Tm. In other embodiments, the recessed face is substantially concave with three upturned points or corners similar to FIG. 2B and a substantially planar second face (the shaped abrasive particle is plano-concave). Notice in FIG. 2B that the difference between Tc and Tm is less and that there is a more gradual transition from the interior of the first face to each upturned point as compared to FIG. 2A. As will be discussed in more detail, it is believed that the recessed face is formed by the sol-gel in the mold cavity 31 forming a meniscus leaving the first face recessed as best seen in FIG. 1B.

As mentioned, the first face 24 is recessed such that the thickness, Tc, at the points or corners 30 tends to be greater than the thickness, Ti, of the interior of the first face 24. As such, the points or corners 30 are elevated higher than the interior of the first face 24. Without wishing to be bound by theory, it is believed that the recessed first face 24 improves the amount of material removed by the dish-shaped abrasive particle 20. In particular, an ice cream scoop or a spoon has a concave shaped end that effectively digs into materials and removes a significant quantity of the material. A scoop is much more effective than a knife or a flat thin body when digging into and removing large quantities of material. Similarly, a hollow ground chisel having a concave surface produces a sharper edge. In a similar manner, having a recessed surface on the dish-shaped abrasive particle 20 is believed to result in the increased grinding performance of the dish-shaped abrasive particle over similarly shaped abrasive particles having a planar first face 24 and a planar second face 26.

Additionally, it is believed that having a thinner interior portion of the shaped abrasive particle may help grinding performance of the dish-shaped abrasive particle once the sharp upturned point or corner is worn away. When the interior portion is thinner, two factors may come into play that improves grinding performance. First, a corresponding wear flat generated during use of the dish-shaped abrasive particle will have less area as compared to a shaped abrasive particle having a thicker interior section. If one particle is half as thick as the next particle then the resulting wear flat will be half the size due to the change in the thickness. Secondly, the thinner interior portion may result in increased fracturing of the dish-shaped abrasive particles during use thereby enhancing the particle's ability to re-sharpen itself through fracture mechanics. A thicker particle is less likely to fracture than a thinner particle.

Figure 5:
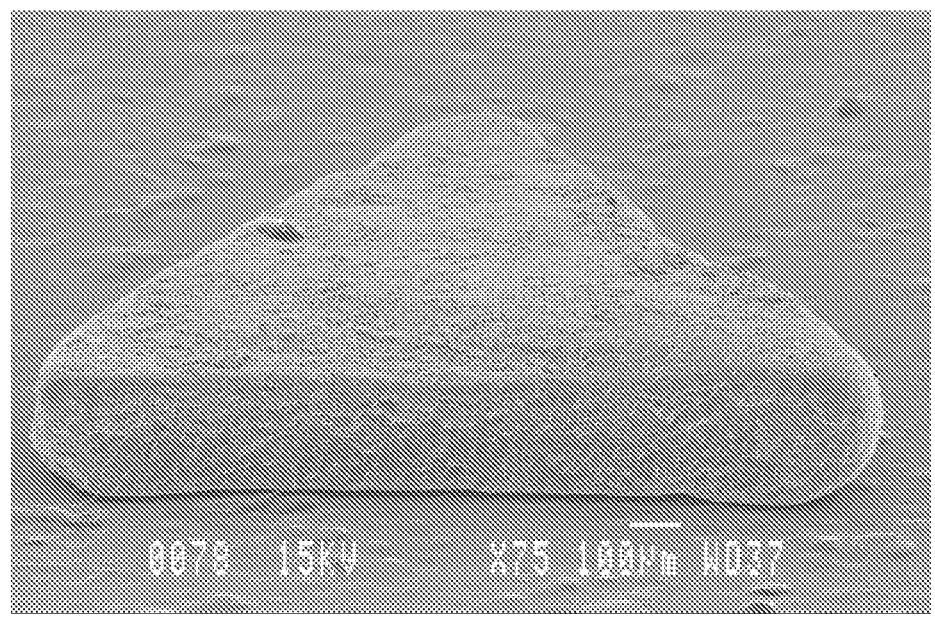
FIG. 5 illustrates a photomicrograph of a prior art shaped abrasive particle made according to the disclosure in U.S. Pat. No. 5,366,523 to Rowenhorst et al.

Referring to FIG. 5, a prior art shaped abrasive particle produced according to the disclosure in U.S. Pat. No. 5,366,523 is shown. The prior art shaped abrasive particle has a substantially planar first face and planar second face, rounded corners at the points of the triangle, and rounded edges where the faces meet with the sidewall.

In various embodiments of the invention, a thickness ratio of Tc/Ti can be between 1.25 to 5.00, or between 1.30 to 4.00, or between 1.30 to 3.00. To calculate the thickness ratio, fifteen randomly selected dish-shaped abrasive particles are screened. The height of each corner of each particle is measured and then all of the heights are averaged to determine an average Tc. For example, a triangle would have three Tc measurements per shaped abrasive particle and 45 measurements total for use in determining the average for Tc. If the shaped abrasive particle is round, oval or otherwise does not have corners or points, then three points equidistant from each other along the perimeter should be measured for each shaped abrasive particle. Next, the smallest thickness, Ti, for the interior of the first face 24 of each shaped abrasive particle is measured. Often the translucency of the shaped abrasive particle can be used to find the minimum interior thickness and the 15 results are averaged to determine an average Ti. The thickness ratio is determined by dividing the average Tc by the average Ti. A light microscope equipped with an X-Y stage and a vertical location measurement stage can be used to measure the thickness of various portions of the dish-shaped abrasive particles. Triangular dish-shaped abrasive particles produced by the invention have been measured to have thickness ratios between 1.55 to 2.32 in some embodiments. Triangular shaped particles produced by the prior art method disclosed in U.S. Pat. No. 5,366,523 entitled Abrasive Article Containing Shaped Abrasive Particles to Rowenhorst et al. have been measured to have thickness ratios between 0.94 to 1.15 meaning they are essentially flat and are just as likely to be slightly thicker in the middle as they are to be slightly thinner in the middle. Dish-shaped abrasive particles having a thickness ratio greater than 1.20 are statistically different from the Rowenhorst particles at the 95% confidence interval.

Referring to FIG. 1B, a draft angle a between the second face 26 and the sidewall 28 of the dish-shaped abrasive particle 20 can be varied to change the relative sizes of each face. For reference, a mold cavity 31 of a mold 33 is shown in dashed lines to visualize how the dish-shaped abrasive particles 20 are made. As discussed in copending patent application U.S. patent application Ser. No. 12/337,075 entitled "Shaped Abrasive Particle With A Sloping Sidewall", filed on Dec. 17, 2008, having a draft angle α greater than 90 degrees is believed to improve the grinding performance of shaped abrasive particles. Furthermore, a slight increase in the draft angle from 90 degrees to 98 degrees has been found to double the cutting performance of triangular shaped abrasive particles and the increased performance is present until the draft angle becomes greater than about 130 degrees.

In various embodiments of the invention, the draft angle α can be between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees.

Referring now to FIG. 1C, a coated abrasive article 40 is shown having a first major surface 41 of a backing 42 covered by an abrasive layer. The abrasive layer comprises a make coat 44, and a plurality of dish-shaped abrasive particles 20 attached to the backing 42 by the make coat 44. A size coat 46 is applied to further attach or adhere the dish-shaped abrasive particles 20 to the backing 42.

As seen, the majority of the dish-shaped abrasive particles 20 are tipped or leaning to one side when the draft angle α is greater than 90 degrees thereby forming a sloping sidewall. This results in the majority of the dish-shaped abrasive particles 20 having an orientation angle β less than 90 degrees relative to the first major surface 41 of the backing 42. This result is unexpected since the electrostatic coating method of applying the dish-shaped abrasive particles with a sloping sidewall tends to originally orientate the particles at an orientation angle β of 90 degrees when they are first applied to the backing. The electrostatic field tends to align the particles vertically when applying them to the backing that is located above the dish-shaped abrasive particles with a sloping sidewall. Furthermore, the electrostatic field tends to accelerate and drive the particles into the make coat at the 90 degree orientation. At some point after the web is turned over, either before or after the size coat 46 is applied, the particles under the force of gravity or the surface tension of the make and size coats tend to lean over and come to rest on the sloping sidewall. It is believed that sufficient time in the process of making the coated abrasive article is present for the dish-shaped abrasive particles to lean over and become attached to the make coat by the sloping sidewall before the make coat and size coat cure and harden preventing any further rotation. As seen, once the dish-shaped abrasive particles with a sloping sidewall are applied and allowed to lean, the highest corners 30 are at a favorable rake angle for abrading a workpiece. In particular, the first face 24 by being recessed results in an acute angle λ between the sidewall 28 and the first face 24 resulting in a very sharp point or corner instead of the rounded corner of the prior art. This gives the dish-shaped abrasive particle a saw tooth point 47 that engages and removes more material; especially, when the draft angle α is greater than 90 degrees.

To further optimize the leaning orientation, the dish-shaped abrasive particles are applied in the backing in an open coat abrasive layer. A closed coat abrasive layer is defined as the maximum weight of abrasive particles or a blend of abrasive particles that can be applied to a make coat of an abrasive article in a single pass through the maker. An open coat abrasive layer is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles. In various embodiments of the invention, the percent open area in the abrasive layer can be between about 10% to about 90% or between about 30% to about 80%.

It is believed that if too many of the dish-shaped abrasive particles with a sloping sidewall are applied to the backing, insufficient spaces between the particles will be present to allow from them to lean or tip prior to curing the make and size coats. In various embodiments of the invention, greater than 50, 60, 70, 80, or 90 percent of the dish-shaped abrasive particles in the coated abrasive article having an open coat abrasive layer are tipped or leaning having an orientation angle β less than 90 degrees.

Without wishing to be bound by theory, it is believed that an orientation angle β less than 90 degrees results in enhanced cutting performance of the dish-shaped abrasive particles with a sloping sidewall. Surprisingly, this result tends to occur regardless of the particles rotational orientation about the Z axis within the coated abrasive article. While FIG. 1C is idealized to show all the dish-shaped abrasive particles aligned in the same direction, an actual coated abrasive disc would have the dish-shaped abrasive particles randomly distributed and rotated at various orientations relative to the Z axis. Since the abrasive disc is rotating and the dish-shaped abrasive particles are randomly distributed, some particles will be driven into the workpiece initially striking the first face 24 while a neighboring dish-shaped abrasive particle could be rotated exactly 180 degrees with the workpiece striking backside of the particle and the second face 26. With a random distribution of the particles and the rotation of the disc, half of the particles could have the workpiece initially striking the second face 26 instead of the first face 24. However, for an abrasive belt having a defined direction of rotation and a defined point of contact with the workpiece, it may be possible to align the dish-shaped abrasive particles with a sloping sidewall on the belt to ensure that the workpiece is driven into the first face 24 first as idealized in FIG. 1C. In various embodiments of the invention, the orientation angle β for a majority of the dish-shaped abrasive particles with a sloping sidewall in an abrasive layer of a coated abrasive article can be between about 50 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees or between about 80 degrees to about 85 degrees.

Referring now to FIGS. 2A, 2B, and 2C a photomicrograph of dish-shaped abrasive particles 20 with a recessed face is shown. The draft angle α is approximately 98 degrees and the dish-shaped abrasive particle's perimeter comprised an equilateral triangle. The sides of each triangle measured approximately 1.4 mm long at the perimeter of the first face 24. To further characterize the recessed face, the curvature of the first face 24 for the dish-shaped abrasive particles were measured by fitting a sphere using a suitable image analysis program such as a non-linear regression curve-fitting program "NLREG", available from Phillip Sherrod, Brentwood, Tenn., obtained from www.NLREG.com. The results of the image analysis showed that the radius of the sphere fitted to the recessed first face can be between about 1 mm to about 25 mm, or between about 1 mm to about 14 mm, or between about 2 mm to about 7 mm, when the center of the sphere is vertically aligned above the midpoint of the first face 24. In one embodiment, the radius of the fitted sphere to the dish-shaped abrasive particles measured 2.0 mm, in another embodiment 3.2 mm, in another embodiment 5.3 mm, and in another embodiment 13.7 mm.

Figure 3A:
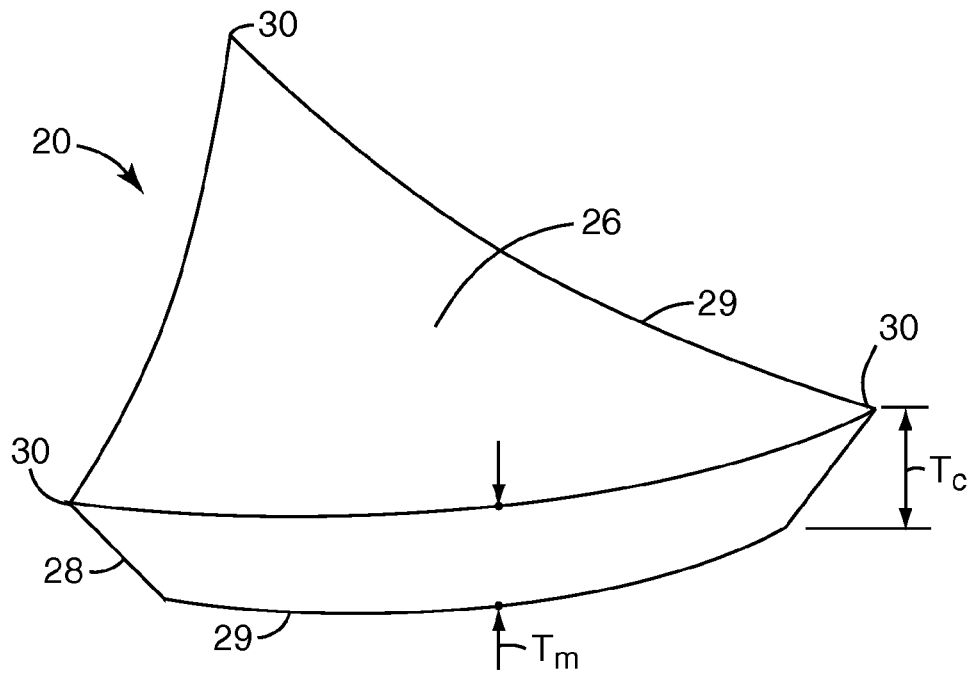
FIG. 3A illustrates a perspective view of another embodiment of a dish-shaped abrasive particle.
Figure 3B:
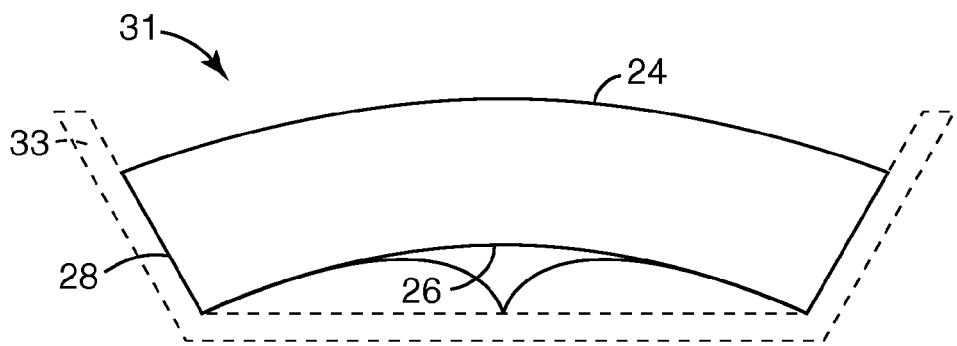
FIG. 3B illustrates a side view of the dish-shaped abrasive particle of FIG. 3A.
Figure 3C:
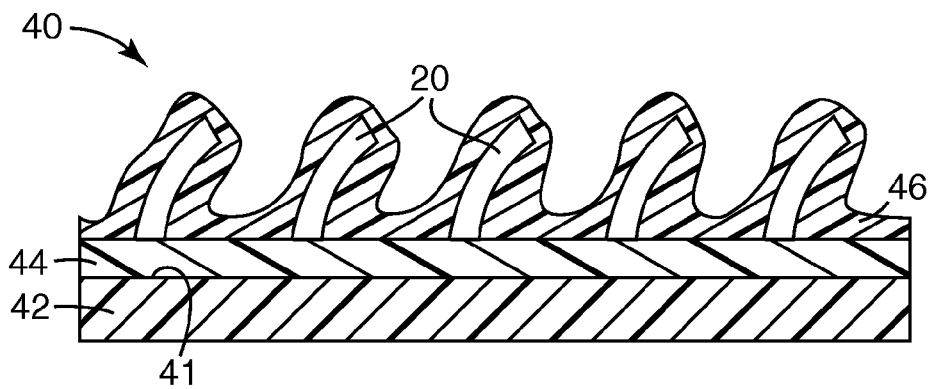
FIG. 3C illustrates a side view of a coated abrasive article made from the dish-shaped abrasive particles of FIG. 3A.

Referring to FIGS. 3A, 3B, and 3C another embodiment of the dish-shaped abrasive particle 20 is illustrated. The material from which the dish-shaped abrasive particle 20 is made comprises alpha alumina. In general, the dish-shaped abrasive particles 20 comprise thin bodies having the first face 24, and the second face 26 separated by the sidewall 28 having a thickness T. In general, the sidewall thickness, T, is more uniform in the second embodiment. As such, Tm can be approximately equal to Tc. In some embodiments, the sidewall 28 is formed in a mold having a draft angle α greater than 90 degrees as discussed in more detail later herein.

The sidewall 28 of the dish-shaped abrasive particle 20 can vary in shape and it forms the perimeter 29 of the first face 24 and the second face 26. In one embodiment, the perimeter 29 of the first face 24 and second face 26 is selected to be a geometric shape, and the first face 24 and the second face 26 are selected to have the same geometric shape, although, they may differ in size with one face being larger than the other face. In one embodiment, the perimeter 29 of first face 24 and the perimeter 29 of the second face 26 was a triangular shape that is illustrated. In some embodiments, an equilateral triangular shape is used and in other embodiments an isosceles triangular shape is used.

In this embodiment, the first face 24 is convex and the second face 26 is concave (concavo-convex) such that the dish-shaped abrasive particle substantially comprises a triangular section of a spherical shell. As will be discussed in more detail, it is believed that the convex face is formed by the sol-gel in the mold cavity 31 releasing from the bottom surface of the mold due to the presence of a mold release agent such as peanut oil during evaporative drying of the sol-gel. The rheology of the sol-gel then results in the convex/concave formation of the first and second face while the perimeter 29 is formed into a triangular shape during evaporative drying.

As mentioned, the second face 26 is concave and formed adjacent to the bottom of the mold cavity 31. As such, when the dish-shaped abrasive particle 20 is sitting on a surface as positioned in FIG. 3A, the points or corners 30 are elevated higher than the interior of the second face 26. Without wishing to be bound by theory, it is believed that the concave second face 26 improves the amount of material removed by the dish-shaped abrasive particle 20. In particular, an ice cream scoop or a spoon has a concave shaped end that effectively digs into materials and removes a significant quantity of the material. A scoop is much more effective than a knife or a flat thin body when digging into and removing large quantities of material. Similarly, a hollow ground chisel having a concave surface produces a sharper edge. In a similar manner, placing a concave surface onto the dish-shaped abrasive particle 20 is believed to result in the increased grinding performance of the dish-shaped abrasive particle over similarly shaped abrasive particles having a planar first face 24 and a planar second surface 26.

Referring now to FIG. 3C, a coated abrasive article 40 is shown having the first major surface 41 of the backing 42 covered by an abrasive layer. The abrasive layer comprises the make coat 44, and the plurality of dish-shaped abrasive particles 20 attached to the backing 42 by the make coat 44. A size coat 46 is applied to further attach or adhere the dish-shaped abrasive particles 20 to the backing 42.

To optimize the orientation in the coated abrasive article, the dish-shaped abrasive particles are applied in the backing in an open coat abrasive layer. A closed coat abrasive layer is defined as the maximum weight of abrasive particles or a blend of abrasive particles that can be applied to a make coat of an abrasive article in a single pass through the maker. An open coat abrasive layer is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles. In various embodiments of the invention, the percent open area in the abrasive layer can be between about 10% to about 90% or between about 30% to about 80%.

Figure 4:
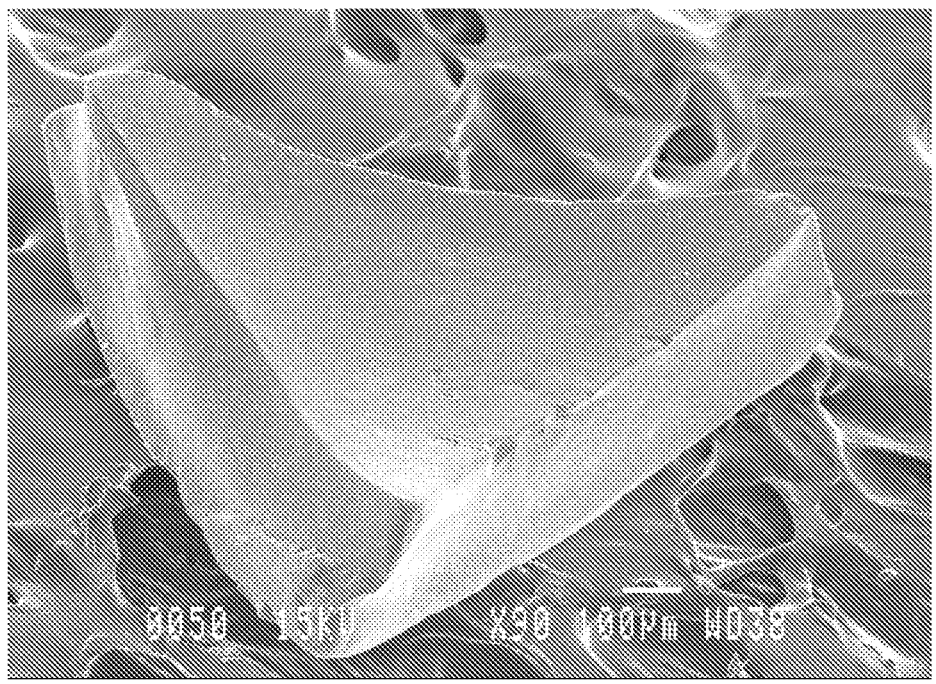
FIG. 4 illustrates a photomicrograph of the dish-shaped abrasive particles of FIG. 3A.

Referring now to FIG. 4 a photomicrograph of a dish-shaped abrasive particle 20 with a concave second face 26 face is shown. The sides of each triangle measured approximately 1.2 mm at the perimeter of the first face 24 and the dish-shaped abrasive particles had a thickness of approximately 0.35 mm. In various embodiments of the invention, the radius of a sphere fitted to the concave second face 26 can be between about 1 mm to about 25 mm, or between about 1 mm to about 14 mm, or between about 2 mm to about 7 mm, when the center of the sphere is vertically aligned above the midpoint of the second face.

Figure 6A:
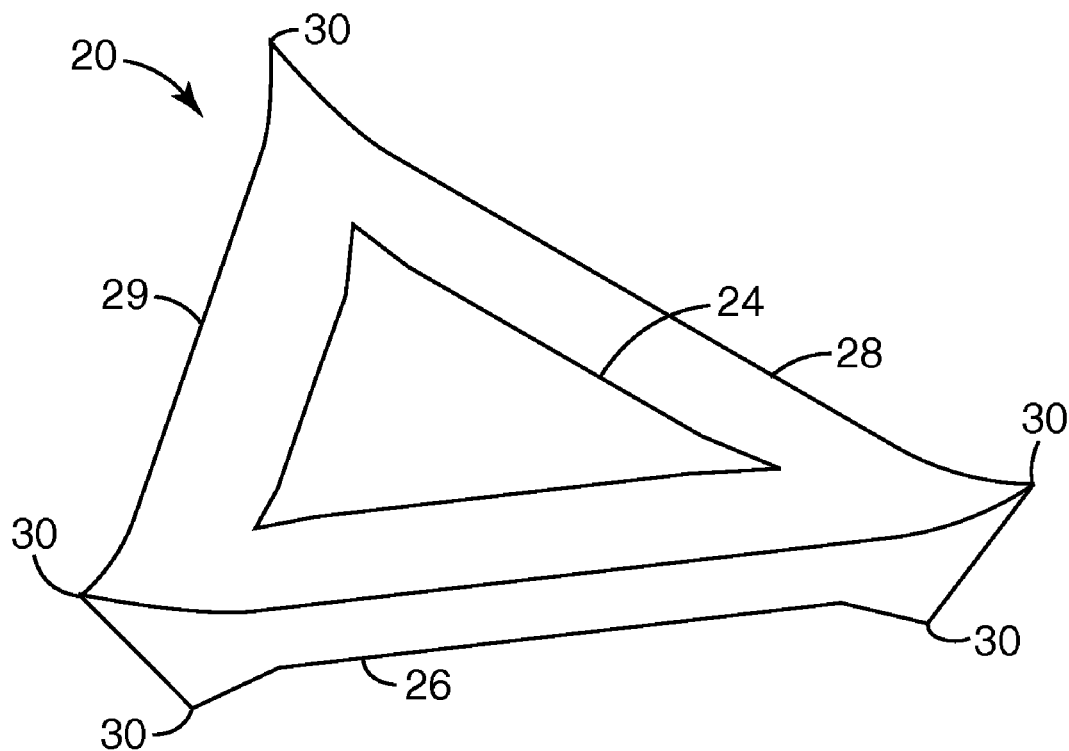
FIG. 6A illustrates a perspective view of another embodiment of a dish-shaped abrasive particle.
Figure 6B:
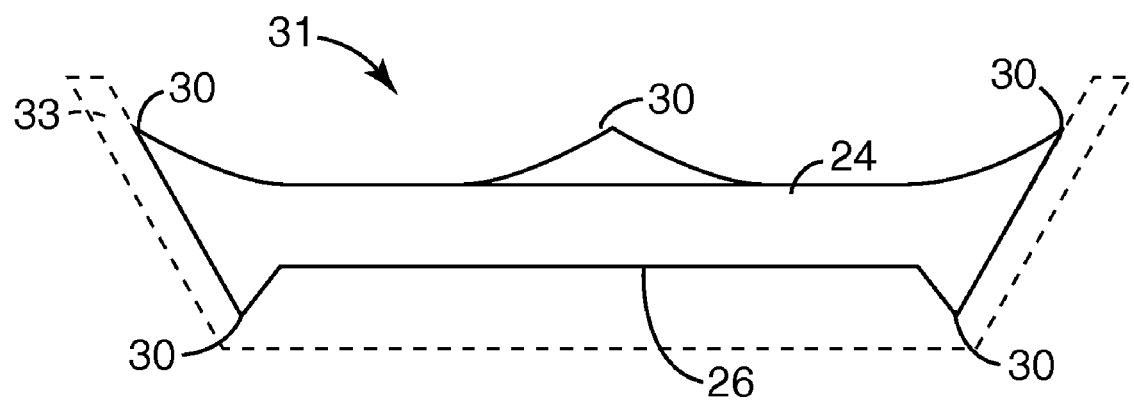
FIG. 6B illustrates a side view of the dish-shaped abrasive particle of FIG. 6A.

Referring now to FIGS. 6A and 6B, in other embodiments of the invention, the first face 24 and the second face 26 of the dish-shaped abrasive particles 20 can both be recessed. In some embodiments, the dish-shaped abrasive particles can be biconcave having a concave first face 24 and a concave second face 26. Such shaped abrasive particles can be made by making the bottom surface of the mold cavity 31 convex such that a concave second face 26 is formed on the shaped abrasive particle. Alternatively, other recessed structural geometries can be formed on the second face 26 by appropriately designing the contour of the bottom surface of the mold cavity. For example, in FIG. 6B, the bottom surface of the mold can have a substantially planar center portion and recessed corners that form a plurality of upturned points or a plurality of raised corners 30 on the second face 26. In such embodiments, the degree of curvature or flatness of the first face 24 can be controlled to some extent by how the dish-shaped abrasive particles are dried thereby resulting in a recessed or curved first face or a substantially planar first face.

For any of the discussed embodiments, the dish-shaped abrasive particles 20 can have various three-dimensional shapes. The geometric shape of the perimeter 29 can be triangular, rectangular, circular, elliptical, star-shaped or that of other regular or irregular polygons. In one embodiment, an equilateral triangle is used and in another embodiment, an isosceles triangle is used. Additionally, the various sidewalls of the dish-shaped abrasive particles can have the same draft angle or different draft angles.

Additionally, the dish-shaped abrasive particles with an opening can have a plurality grooves on one of the faces as described in copending application U.S. Ser. No. 12/627,567 entitled "Shaped Abrasive Particles With Grooves", and filed on Dec. 17, 2008. The plurality of grooves are formed by a plurality of ridges in the bottom surface of the mold cavity that have been found to make it easier to remove the precursor shaped abrasive particles from the mold. In one embodiment, the plurality of grooves comprises parallel lines extending completely across the second face and intersecting with the perimeter 29 along a first edge at a 90 degree angle. The plurality of groove's cross sectional geometry can be a truncated triangle, triangle, or other geometry as discussed in the pending application.

In various embodiments of the invention, the depth, D, of the plurality of grooves can between about 1 micrometer to about 400 micrometers. Furthermore, a percentage ratio of the groove depth, D, to the dish-shaped abrasive particle's thickness, Tc, (D/Tc expressed as a percent) can be between about 0.1% to about 30%, or between about 0.1% to 20%, or between about 0.1% to 10%, or between about 0.5% to about 5%.

In various embodiments of the invention, the spacing between each groove can be between about 1% to about 50%, or between about 1% to 40%, or between about 1% to 30%, or between about 1% to 20%, or between about 5% to 20% of a face dimension such as the length of one of the edges of the dish-shaped abrasive particle. In one embodiment, an equilateral triangle having a side length at the bottom surface of the mold of 2.54 millimeters and having 8 ridges per mold cavity at a spacing of 0.277 mm had a groove spacing of 10.9%. In other embodiments of the invention the number of ridges in the bottom surface of each mold cavity can be between 1 and about 100, or between 2 to about 50, or between about 4 to about 25 and thus form a corresponding number of groves in the dish-shaped abrasive particles.

Figure 7:
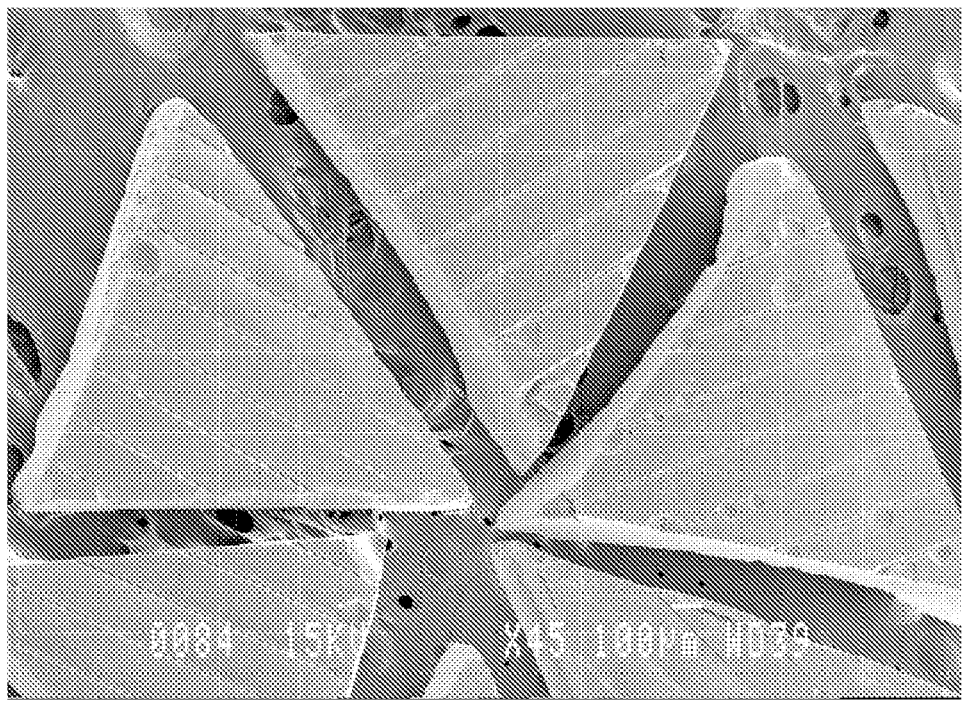
FIG. 7 illustrates a bottom view of another embodiment of the dish-shaped abrasive particles of FIGS. 1A and 1B having a plurality of grooves on the planar surface.
Figure 8:
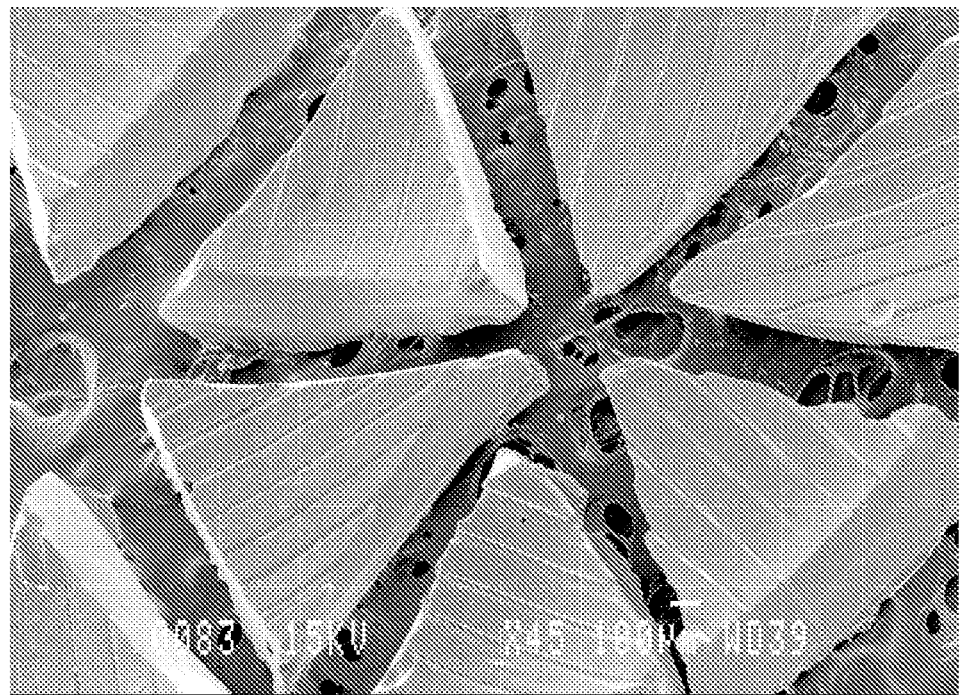
FIG. 8 illustrates a bottom view of another embodiment of the dish-shaped abrasive particles of FIGS. 3A and 3B having a plurality of grooves on the concave surface.

In one embodiment of the production tooling, triangular shaped mold cavities of 28 mils depth and 110 mils on each side was used. The draft angle α between the sidewall and bottom of the mold was 98 degrees. The production tooling was manufactured to have 50% of the mold cavities with 8 parallel ridges rising from the bottom surfaces of the cavities that intersected with one side of the triangle at a 90 degree angle and the remaining cavities had a smooth bottom mold surface. The parallel ridges were spaced every 0.277 mm and the cross section of the ridges was a triangle shape having a height of 0.0127 mm and a 45 degree angle between the sides of each ridge at the tip as described in patent application referred to above. Referring now to FIG. 7, a photomicrograph of the dish-shaped abrasive particles produced from the described production tooling showing a plurality of parallel grooves on the second face 26 corresponding to the dish-shaped abrasive particles of FIG. 1A is shown. Referring now to FIG. 8, a photomicrograph of the dish-shaped abrasive particles produced from the described production tooling showing a plurality of parallel grooves on the second face 26 corresponding to the dish-shaped abrasive particles of FIG. 3A is shown. Since the grooves are on the concave face, it is clear that this face was originally in contact with the planar bottom surface of the mold and then became concave at some point during the drying process after the sol-gel was sufficiently dried to retain the impression from the ridges in the bottom surface.

The dish-shaped abrasive particles 20 can have various volumetric aspect ratios. The volumetric aspect ratio is defined as the ratio of the maximum cross sectional area passing through the centroid of a volume divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a uniform thickness equal to A will have a volumetric aspect ratio of 1.54, and if the uniform thickness is reduced to 0.25 A, the volumetric aspect ratio is increased to 2.64. It is believed that dish-shaped abrasive particles having a larger volumetric aspect ratio have enhanced cutting performance. In various embodiments of the invention, the volumetric aspect ratio for the dish-shaped abrasive particles can be greater than about 1.15, or greater than about 1.50, or greater than about 2.0, or between about 1.15 to about 10.0, or between about 1.20 to about 5.0, or between about 1.30 to about 3.0.

Dish-shaped abrasive particles 20 made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the dish-shaped abrasive particles 20 can graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20 meaning that the dish-shaped abrasive particles 20 pass through a test sieve meeting ASTM E-11 specifications for the number 18 sieve and are retained on a test sieve meeting ASTM E-11 specifications for the number 20 sieve. In one embodiment, the dish-shaped abrasive particles 20 have a particle size such that most of the particles pass through an 18 mesh test sieve and can be retained on a 20, 25, 30, 35, 40, 45, or 50 mesh test sieve. In various embodiments of the invention, the dish-shaped abrasive particles 20 can have a nominal screened grade comprising: 31 18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

In one aspect, the present disclosure provides a plurality of abrasive particles having an abrasives industry specified nominal grade or nominal screened grade, wherein at least a portion of the plurality of abrasive particles are dish-shaped abrasive particles 20. In another aspect, the disclosure provides a method comprises grading the dish-shaped abrasive particles 20 made according to the present disclosure to provide a plurality of dish-shaped abrasive particles 20 having an abrasives industry specified nominal grade or a nominal screened grade.

If desired, the dish-shaped abrasive particles 20 having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are dish-shaped abrasive particles 20 made according to the present disclosure, based on the total weight of the plurality of abrasive particles.

Particles suitable for mixing with the dish-shaped abrasive particles 20 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped dish-shaped abrasive particles 20 (triangles and squares for example) or blends of dish-shaped abrasive particles 20 with recessed faces and concave faces for example can be used in the articles of this invention.

The dish-shaped abrasive particles 20 may also have a surface coating. Surface coatings are known to improve the adhesion between abrasive grains and the binder in abrasive articles or can be used to aid in electrostatic deposition of the dish-shaped abrasive particles 20. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the dish-shaped abrasive particles from capping. Capping is the term to describe the phenomenon where metal particles from the workpiece being abraded become welded to the tops of the abrasive particles. Surface coatings to perform the above functions are known to those of skill in the art.

Abrasive Article Having Dish-Shaped Abrasive Particles

Referring to FIGS. 1C and 3C, a coated abrasive article 40 comprises a backing 42 having a first layer of binder, hereinafter referred to as the make coat 44, applied over a first major surface 41 of backing 42. Attached or partially embedded in the make coat 44 are a plurality of dish-shaped abrasive particles 20 forming an abrasive layer. Over the dish-shaped abrasive particles 20 is a second layer of binder, hereinafter referred to as the size coat 46. The purpose of make coat 44 is to secure dish-shaped abrasive particles 20 to backing 42 and the purpose of size coat 46 is to reinforce dish-shaped abrasive particles 20.

The make coat 44 and size coat 46 comprise a resinous adhesive. The resinous adhesive of the make coat 44 can be the same as or different from that of the size coat 46. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 44 or size coat 46, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

A grinding aid can be applied to the coated abrasive article. A grinding aid is defined as particulate material, the addition of which has a significant effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In one embodiment, the grinding aid was cryolite or potassium tetrafluoroborate. The amount of such additives can be adjusted to give desired properties. It is also within the scope of this invention to utilize a supersize coating. The supersize coating typically contains a binder and a grinding aid. The binders can be formed from such materials as phenolic resins, acrylate resins, epoxy resins, urea-formaldehyde resins, melamine resins, urethane resins, and combinations thereof.

It is also within the scope of this invention that the dish-shaped abrasive particles 20 can be utilized in a bonded abrasive article, a nonwoven abrasive article, or abrasive brushes. A bonded abrasive can comprises a plurality of the dish-shaped abrasive particles 20 bonded together by means of a binder to form a shaped mass. The binder for a bonded abrasive can be metallic, organic, or vitreous. A nonwoven abrasive comprises a plurality of the dish-shaped abrasive particles 20 bonded into a fibrous nonwoven web by means of an organic binder.

Method of Dish-Shaped Abrasive Particles

The first process step involves providing either a seeded on un-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of alpha aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HI-Q40" available from BASF Corporation. These aluminum oxide monohydrates are relatively pure, i.e., they include relatively little, if any, hydrate phases other than monohydrates, and have a high surface area. The physical properties of the resulting dish-shaped abrasive particles 20 and resulting size of the particles will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, simply by mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold 33 having at least one mold cavity 31, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. The production tool comprises polymeric material. Examples of suitable polymeric materials include thermoplastics such as polyesters, polycarbonates, poly(ether sulfone), poly(methyl methacrylate), polyurethanes, polyvinylchloride, polyolefins, polystyrene, polypropylene, polyethylene or combinations thereof, and thermosetting materials. In one embodiment, the entire tooling is made from a polymeric or thermoplastic material. In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric or thermoplastic sheet material can be heated along with the master tool such that the polymeric or thermoplastic material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or from an opening in the bottom surface. In some instances, the cavity can extend for the entire thickness of mold. Alternatively, the cavity can extend only for a portion of the thickness of the mold. In one embodiment, the top surface is substantially parallel to bottom surface of the mold with the cavities having a substantially uniform depth. At least one side of the mold, i.e. the side in which the cavity is formed, can remain exposed to the surrounding atmosphere during the step in which the volatile component is removed.

The cavity has a specified three-dimensional shape. In one embodiment, the shape of a cavity can be described as being a triangle, as viewed from the top, having a sloping sidewall such that the bottom surface of the cavity is slightly smaller than the opening in the top surface. A sloping sidewall is believed to enable easier removal of the precursor abrasive particles from the mold. In various embodiments of the disclosure, the predetermined angle α can be between about 95 degrees to about 130 degrees, or between about 95 degrees to about 120 degrees such as 98 degrees. In another embodiment, the mold comprised a plurality of triangular cavities. Each of the plurality of triangular cavities comprises an equilateral triangle.

Alternatively, other cavity shapes can be used, such as, circles, rectangles, squares, hexagons, stars, or combinations thereof, all having a substantially uniform depth dimension. The depth dimension is equal to the perpendicular distance from the top surface to the lowermost point on the bottom surface. In addition, a cavity can have the inverse of other geometric shapes, such as, for example, pyramidal, frusto-pyramidal, truncated spherical, truncated spheroidal, conical, and frusto-conical. The depth of a given cavity can be uniform or can vary along its length and/or width. The cavities of a given mold can be of the same shape or of different shapes.

The third process step involves filling the cavities in the mold with the abrasive dispersion by any conventional technique. In one embodiment, the top surface of the mold is coated with the abrasive dispersion. The abrasive dispersion can be pumped onto top surface. Next, a scraper or leveler bar can be used to force the abrasive dispersion fully into the cavity of the mold. The remaining portion of the abrasive dispersion that does not enter cavity can be removed from top surface of the mold and recycled. In some embodiments, a knife roll coater or vacuum slot die can be used. In some embodiments, a small portion of the abrasive dispersion can remain on top surface and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface to ensure uniformity in thickness of the resulting abrasive particles.

In one embodiment, the internal surfaces of the cavity including the sidewall and the bottom surface are coated with a mold release agent. Typical mold release agents include, for example, oils such as peanut oil, fish oil, or mineral oil, silicones, polytetrafluoroethylene, zinc sterate, and graphite.

The fourth process step involves controlling the rheology of the sol-gel in the mold to make different types of dish-shaped abrasive particles. In particular, the inventors have surmised that the absence or presence of a mold release agent contributes to the type of dish-shaped abrasive particle produced. When no mold release agent or a small amount of mold release agent is present on the surfaces of the tooling in contact with the sol-gel, the sol-gel tends to wet the surfaces of the tooling and form a meniscus in the first face 24. When more mold release agent is present or an excess of mold release agent is present on the surfaces of the tooling in contact with the sol-gel, the precursor shaped abrasive particles tend to release from the bottom surface of the mold during drying thereby forming convex/concave faces on the dish-shaped abrasive particles. In general, between about 0.0% to about 5% by weight mold release agent, such as peanut oil, in a liquid, such as water or alcohol, is applied to the surfaces of the production tooling in contact with the sol-gel such that between 0.0 mg/in$^2$ to about 3.0 mg/in$^2$, or about 0.1 mg/in$^2$ to about 5.0 mg/in$^2$ of the mold release agent is present per unit area of the mold when a mold release is desired.

The fifth process step involves removing the plurality of precursor dish-shaped abrasive particles from the mold cavities. The plurality of precursor dish-shaped abrasive particles can be removed from the cavities by using the following processes alone or in combination on the mold: gravity, vibration, ultrasonic vibration, vacuum, or pressurized air to remove the particles from the mold.

The precursor dish-shaped abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor dish-shaped abrasive particles will be dried from 10 to 480 minutes, or from 120 to 400 minutes, at a temperature from 50 degrees C. to 160 degrees C., or at 120 degrees C. to 150 degrees C.

The sixth process step involves calcining the plurality of precursor dish-shaped abrasive particles. During calcining, essentially all the volatile material is removed, and the various components that were present in the abrasive dispersion are transformed into metal oxides. The precursor dish-shaped abrasive particles are generally heated to a temperature from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor dish-shaped abrasive particles. Then the plurality of precursor dish-shaped abrasive particles are prefired again. This option is further described in European Patent Application No. 293,163.

The seventh process step involves sintering the calcined, plurality of dish-shaped precursor abrasive. Prior to sintering, the calcined, precursor dish-shaped abrasive particles are not completely densified and thus lack the desired hardness to be used as abrasive particles. Sintering takes place by heating the calcined, precursor dish-shaped abrasive particles to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, precursor dish-shaped abrasive particles must be exposed to the sintering temperature to achieve this level of conversion depends upon various factors but usually from five seconds to 48 hours is typical. In another embodiment, the duration for the sintering step ranges from one minute to 90 minutes. After sintering, the dish-shaped abrasive particles can have a Vickers hardness of 10 GPa, 16 GPa, 18 GPa, 20 GPa, or greater Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser. More information concerning methods to make shaped abrasive particles is disclosed in copending U.S. patent application Ser. No. 12/337,001 entitled "Method Of Making Abrasive Shards, Shaped Abrasive Particles With An Opening, Or Dish-Shaped Abrasive Particles", and filed on Dec. 17, 2008.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Preparation of Planar/Concave Precursor Shaped Abrasive Particles (FIGS. 2A-2C, 7)

A sample of boehmite sol-gel was made using the following recipe: aluminum oxide monohydrate powder (7333 parts) having the trade designation "DISPERAL" was dispersed by high shear mixing a solution containing water (11000 parts) and 70% aqueous nitric acid (293 parts) for 10 minutes. The resulting sol-gel was aged for 1 hour before coating. The sol-gel was forced into production tooling having triangular shaped mold cavities of 28 mils depth and 110 mils on each side. The draft angle α between the sidewall and bottom of the mold was 98 degrees. The production tooling was manufactured to have 50% of the mold cavities with 8 parallel ridges rising from the bottom surfaces of the cavities that intersected with one side of the triangle at a 90 degree angle and the remaining cavities had a smooth bottom mold surface. The parallel ridges were spaced every 0.277 mm and the cross section of the ridges was a triangle shape having a height of 0.0127 mm and a 45 degree angle between the sides of each ridge at the tip as described in pending patent application referred to above. The sol-gel was forced into the cavities with a vacuum slot die coating station so that all the openings of the production tooling were completely filled. The sol-gel coated production tooling was passed through a 27 foot convection air oven at 10 feet per minute set to 300 degrees Fahrenheit at 40% air velocity in the 13.5 foot zone 1 section and 325 degrees Fahrenheit at 40% air velocity in the 13.5 foot zone 2 section. The precursor shaped abrasive particles were removed from the production tooling by passing it over an ultrasonic horn.

Preparation of Concave/Convex Precursor Shaped Abrasive Particles (FIGS. 4, 8)

A sample of boehmite sol-gel was made using the following recipe: aluminum oxide monohydrate powder (4824 parts) having the trade designation "DISPERAL" was dispersed by high shear mixing a solution containing water (7087 parts) and 70% aqueous nitric acid (212 parts) for 13 minutes. The resulting sol-gel was aged for 1 hour before coating. The sol-gel was forced into production tooling having triangular shaped mold cavities of 28 mils depth and 110 mils on each side. The draft angle α between the sidewall and bottom of the mold was 98 degrees. The production tooling was manufactured to have 50% of the mold cavities with 8 parallel ridges rising from the bottom surfaces of the cavities that intersected with one side of the triangle at a 90 degree angle and the remaining cavities had a smooth bottom mold surface. The parallel ridges were spaced every 0.277 mm and the cross section of the ridges was a triangle shape having a height of 0.0127 mm and a 45 degree angle between the sides of each ridge at the tip as described in pending patent application referred to above. The sol-gel was forced into the cavities with a vacuum slot die coating station so that all the openings of the production tooling were completely filled. A mold release agent, 2% peanut oil in water was used coated on the production tooling with about 1 mg/in$^2$ of peanut oil applied to the production tooling. The sol-gel coated production tooling was passed through a 27 foot convection air oven at 11 feet per minute set to 280 degrees Fahrenheit at 60% air velocity in the 13.5 foot zone 1 section and 250 degrees Fahrenheit at 40% air velocity in the 13.5 foot zone 2 section. The precursor shaped abrasive particles were removed from the production tooling by passing it over an ultrasonic horn.

Preparation of Prior Art Shaped Abrasive Particles (FIG. 5)

Prior art shaped abrasive particles were made according to the procedure disclosed in U.S. Pat. No. 5,366,523 to Rowenhorst et al. An abrasive dispersion (44% solids) was made by the following procedure: aluminum monohydrate powder (1,235 parts) having the trade designation "DISPERAL" was dispersed by continuously mixing a solution containing water (3,026 parts) and 70% aqueous nitric acid (71 parts). The sol that resulted was dried at a temperature of approximately 125 degrees C. in a continuous dryer to produce a 44% solids abrasive dispersion. The abrasive dispersion was introduced into triangular shaped mold cavities by means of a rubber squeegee. The cavities were coated with a silicone release material prior to introduction of the abrasive dispersion. The mold was an aluminum sheet containing multiple equilateral triangle-shaped holes that were punched through the aluminum sheet. The sizes of the triangular-shaped holes were 28 mils depth and 110 mils on each side. The filled mold was place in a forced air oven maintained at a temperature of 71 degrees C. for 20 minutes. The abrasive dispersion underwent substantial shrinkage as it dried, and the precursor shaped abrasive particles shrank within the cavities. The precursor shaped abrasive particles were removed from the mold by gravity after which they were dried at a temperature of 121 degrees C. for three hours.

All three of the precursor shaped abrasive particles were calcined at approximately 650 degree Celsius and then saturated with a mixed nitrate solution of the following concentration (reported as oxides): 1.8% each of $MgO, Y_2O_3, Nd_2O_3$ and $La_2O_3$. The excess nitrate solution was removed and the saturated precursor shaped abrasive particles were allowed to dry after which the precursor shaped abrasive particles were again calcined at 650 degrees Celsius and sintered at approximately 1400 degree Celsius to produce shaped abrasive particles. Both the calcining and sintering was performed using rotary tube kilns.

The fourth lot used was a coarse grade CUBITRON Abrasive Grain 321 available from 3M Company, St. Paul, Minn.

The four lots of abrasive particles were graded to sizes 31 18+20 mesh (USA Standard Testing Sieves) to remove any shards or broken shapes. Each lot was mixed with an equal quantity by weight of −25+30 mesh (USA Standard Testing Sieves) of calcium carbonate particles. The −25+30 designation refers to the particle sizes which passed through a 25 mesh screen and were retained on a 30 mesh screen. The four lots were subsequently coated onto fiber disc backings at a level of 18 grams per disc of the abrasive particles/calcium carbonate mixture using a calcium carbonate filled make coating, cryolite filled size coating and potassium fluoroborate ($KBF_4$) filled supersize coating. The four lots that were prepared included:

1. Planar/Concave Triangles FIGS. 2A-2C, 7
2. Concave/Convex Triangles FIGS. 4, 8
3. Prior Art Shaped Abrasive Triangles FIG. 5
4. CUBITRON Abrasive Grain 321 (random crushed)

The grinding performance of the discs was evaluated using a Slide Action Grinding Test on a 304 stainless steel workpiece using 18 lbs force of load on the workpiece against the abrasive disc. The Slide Action Grinding Test is designed to measure the cut rate of the coated abrasive disc. Each abrasive disc was used to grind the face of a 1.25 cm by 18 cm 304 stainless steel workpiece. The grinder used was a constant load disc grinder. The constant load between the workpiece and the abrasive disc was provided by a load spring. The back-up pad for the grinder was an aluminum back-up pad, beveled at approximately 7 degrees, extending from the edge and in towards the center 3.5 cm. The abrasive disc was secured to the aluminum pad by a retaining nut and was driven at 5,000 rpm. The amount of metal in grams removed at one-minute intervals was recorded.

Figure 9:
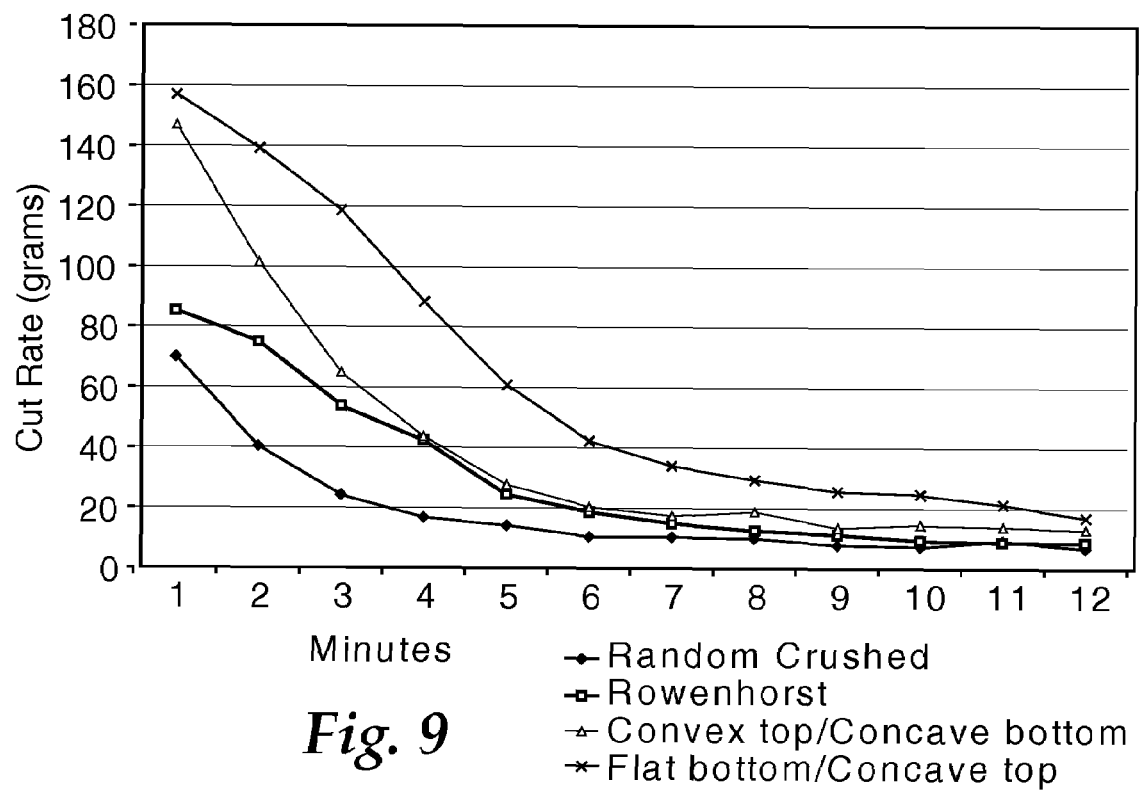
FIG. 9 illustrates a graph of Cut Rate versus Time for the dish-shaped abrasive particles.

Referring to FIG. 9, the dish-shaped abrasive particles 20 performed significantly better than the prior art triangular shaped abrasive particles disclosed in U.S. Pat. No. 5,366,523 to Rowenhorst et al. having two parallel planar surfaces (FIG. 5.), or the random crushed grain. In particular, the dish-shaped abrasive particles had almost twice the initial cut rate of the prior art shaped abrasive particles, which is a tremendous improvement for an abrasive disc. Furthermore, the dish-shaped abrasive particles maintained a higher cut rate throughout the test as compared to the prior art shaped abrasive particles.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. Abrasive particles comprising: dish-shaped abrasive particles each having a sidewall, each of the dish-shaped abrasive particles comprising alpha alumina and having a first face and a second face separated by a sidewall having a varying thickness, T; wherein the first face is recessed and a thickness ratio of Tc/Ti for the dish-shaped abrasive particles is between 1.25 to 5.00; and a draft angle α between the second face and the sidewall and wherein the draft angle α is between about 95 degrees to about 130 degrees.

2. The abrasive particles of claim 1 comprising a radius of a sphere curved fitted to the first face by image analysis and wherein the radius is between about 1 mm to about 25 mm.

3. The abrasive particles of claim 2 wherein the radius of the sphere curved fitted to the first face by image analysis is between about 1 mm to about 14 mm.

4. The abrasive particles of claim 1 wherein the thickness ratio of Tc/Ti for the dish-shaped abrasive particles is between 1.30 to 3.00.

5. The abrasive particles of claim 1 wherein the second face is substantially planar.

6. The abrasive particles of claim 5 wherein the first face comprises a substantially planar center portion and a plurality of raised corners.

7. The abrasive particles of claim 5 wherein the first face is concave.

8. The abrasive particles of claim 1, 5, 6, or 7 wherein the draft angle α is between about 95 degrees to about 110 degrees.

9. The abrasive particles of claim 1, 5, 6, or 7 comprising a perimeter of the first face and a perimeter of the second face and wherein the perimeter comprises a triangular shape.

10. The abrasive particles of claim 9 wherein the triangular shape comprises an equilateral triangle.

11. Abrasive particles comprising: dish-shaped abrasive particles each having a sidewall, each of the dish-shaped abrasive particles comprising alpha alumina and having a first face and a second face separated by a thickness, T, and wherein the first face is convex and the second face is concave; and wherein a perimeter of the first face and a perimeter of the second face comprises a triangular shape.

12. The abrasive particles of claim 11 comprising a radius of a sphere curved fitted to the second face by image analysis and wherein the radius is between about 1 mm to about 25 mm.

13. The abrasive particles of claim 12 wherein the radius of the sphere curved fitted to the second face by image analysis is between about 1 mm to about 14 mm.

14. The abrasive particles of claim 11 wherein the triangular shape comprises an equilateral triangle.

15. Abrasive particles comprising: dish-shaped abrasive particles each having a sidewall, each of the dish-shaped abrasive particles comprising alpha alumina and having a first face and a second face separated by a sidewall having a varying thickness, T, and wherein the first face is recessed and the second face is recessed; and wherein a perimeter of the first face and a perimeter of the second face comprises a triangular shape.

16. The abrasive particles of claim 15 wherein the first face is concave and the second face is concave.

17. The abrasive particles of claim 15 wherein the first face comprises a substantially planar center portion and a plurality of raised corners, and the second face comprises a substantially planar center portion and a plurality of raised corners.

18. The abrasive particles of claim 1, 11 or 15 comprising a binder forming an abrasive article selected from the group consisting of bonded abrasive articles, coated abrasive articles, nonwoven abrasive articles, and abrasive brushes.

19. The abrasive particles of claim 1, 11, or 15 attached to a make coat on a first major surface of a backing and a majority of the dish-shaped abrasive particles adhered to the make coat by the sidewall, the dish-shaped abrasive particles forming an abrasive layer, the abrasive layer coated with a size coat, and wherein the abrasive layer comprises at least 5 percent by weight of the dish-shaped abrasive particles.

20. A method of making the abrasive particles of claim 1 or 15 comprising:
   providing a mold having a plurality of cavities, the plurality of cavities comprising polymeric surfaces;
   filling the plurality of cavities with a sol-gel, the sol-gel comprising particles that can be converted into alpha alumina in a liquid, the liquid comprising a volatile component; and
   removing at least a portion of the volatile component from the sol-gel while the sol-gel resides in the plurality of cavities forming a meniscus in the first face thereby forming a plurality of precursor dish-shaped abrasive particles; and
   sintering the plurality of precursor dish-shaped abrasive particles.

* * * * *

UNITED STATES PATENT AND TRADEMARK OFFICE
CERTIFICATE OF CORRECTION

PATENT NO. : 8,142,891 B2
APPLICATION NO. : 12/336961
DATED : March 27, 2012
INVENTOR(S) : Scott R Culler It is certified that error appears in the above-identified patent and that said Letters Patent is hereby corrected as shown below:

Column 3
Line 65, delete "that that" and insert -- that --, therefor.

Column 5
Line 23, delete "a" and insert -- α --, therefor.

Column 9
Line 60, after "application" insert -- Ser. No. 12/627,567 --.

Column 10
Line 54, delete "P600P800," and insert -- P600, P800, --, therefor.

Column 11
Line 9, delete "31 18+20," and insert -- -18+20, --, therefor.
Line 36, delete "erodable" and insert -- erodible --, therefor.

Column 15
Line 48, delete "sterate," and insert -- stearate, --, therefor.

Column 16
Line 35, delete "prefired" and insert -- fired --, therefor.
Line 56, delete "greater" and insert -- greater. --, therefor.

Column 17
Line 33, After "application" insert -- Ser. No. 12/627,567 --.
Line 63, after "application" insert -- Ser. No. 12/627,567 --.

Column 18
Lines 46-47, delete "31 18+20," and insert -- -18+20, --, therefor.

Signed and Sealed this
Fifth Day of June, 2012

David J. Kappos
*Director of the United States Patent and Trademark Office*